United States Patent [19] [11] 4,208,487
Wang et al. [45] Jun. 17, 1980

[54] NOVEL FROTHER COMPOSITION FOR BENEFICIATION OF MINERAL ORES

[75] Inventors: Samuel S. Wang, Cheshire; Eugene L. Smith, Jr.; Ernie F. Huliganga, both of Milford, all of Conn.

[73] Assignee: American Cyanamid Company, Stamford, Conn.

[21] Appl. No.: 12,273

[22] Filed: Feb. 15, 1979

Related U.S. Application Data

[63] Continuation-in-part of Ser. No. 817,410, Jul. 20, 1977, abandoned.

[51] Int. Cl.$^2$ .................... C08V 9/30

[52] U.S. Cl. .................... 521/117; 209/166; 209/167; 252/61; 521/88; 521/187; 521/188; 544/196

[58] Field of Search .................... 521/188; 521/117, 88, 521/187

[56] References Cited

U.S. PATENT DOCUMENTS

| | | | |
|---|---|---|---|
| 2,076,295 | 4/1937 | Curs et al. | 521/188 |
| 2,323,831 | 7/1943 | Meuger et al. | 521/188 |
| 2,807,595 | 9/1957 | Brown | 521/188 |
| 3,383,338 | 5/1968 | Wells et al. | 521/188 |
| 3,393,161 | 7/1968 | Avis et al. | 521/188 |
| 3,414,526 | 12/1968 | Mason | 521/188 |
| 3,470,115 | 9/1969 | Moore, Jr. et al. | 521/188 |
| 3,506,599 | 4/1970 | Dean | 521/187 |
| 3,554,936 | 1/1971 | Braude et al. | 521/188 |
| 3,631,134 | 12/1971 | Scheuermann et al. | 521/188 |
| 3,645,491 | 2/1972 | Brown et al. | 521/188 |
| 3,779,955 | 12/1973 | Wade | 521/188 |
| 3,855,161 | 12/1974 | Bauer | 521/188 |
| 3,979,341 | 9/1976 | Widmanna | 521/188 |
| 3,989,470 | 11/1976 | Czurak et al. | 521/188 |
| 4,016,111 | 4/1977 | Wolff et al. | 521/188 |
| 4,071,480 | 1/1978 | Rademackers | 521/187 |
| 4,107,105 | 8/1978 | Korf | 521/188 |
| 4,128,475 | 12/1978 | Wang et al. | 209/166 |
| 4,129,533 | 12/1978 | Moore, Jr. | 521/188 |

*Primary Examiner*—Morton Foelak
*Attorney, Agent, or Firm*—William J. vanLoo

[57] ABSTRACT

A combination of conventional frothing agent and a particular amino-aldehyde resin provides better recovery of mineral values than can be obtained with either agent alone.

5 Claims, No Drawings

NOVEL FROTHER COMPOSITION FOR BENEFICIATION OF MINERAL ORES

CROSS-REFERENCE TO RELATED APPLICATIONS

This application is a continuation in part of application Ser. No. 817,410 filed July 20, 1977, now abandoned, which application is related to application Ser. No. 817,411, filed on even date therewith, now U.S. Pat. No. 4,128,475, patented Dec. 5, 1978.

This invention relates to a synergistic frother combination for froth flotation of mineral values. More particularly, this relates to such a composition comprising a mixture of a conventional frothing agent or mixture thereof and an amino-resin in effective proportions.

Ore flotation is a process for separating finely ground valuable minerals from their associated gaugue or for separating valuable components one from the other. The process is based on the affinity of properly prepared surfaces for air bubbles. In froth flotation, a froth is formed by introducing air into a pulp of the finely divided ore and water containing a frothing agent. Froth flotation is the principal means of concentrating copper, lead, zinc, phosphate, and potash ores as well as a host of others. Its chief advantage is that it is a relatively efficient operation at a substantially lower cost than many other processes.

Frothing agents are used to provide a stable flotation froth, persistent enough to facilitate the mineral separation, but not so persistent that it cannot be broken to allow subsequent processing. The most commonly used frothing agents are pine oil (an impure terpineol, $C_{10}H_{17}OH$); creosote and cresylic acid; and alcohols such as 4-methyl-2-pentanol, and polypropylene glycols and ethers.

In addition to the frothing agents, the aqueous ore slurry being processed will contain a selected collector which has particular selectivity for the mineral values that are desired to be recovered by froth flotation. Thus, the slurry containing ore and frother is conditioned with the proper collector and subjected to froth flotation by introducing air into such slurry. A froth is generated by action of the air introduced and the frother. The desired mineral values coated with the selected collector entrap the air bubbles and are levitated as a result, rising into the froth layer which overflows the flotation device. The operation is continued until further build-up of levitated mineral values in the froth ceases. The mineral values recovered by froth flotation of the native ore is designated as the "rougher concentrate" and the residue is designated as the "rougher tails." Subsequently, the rougher concentrate may be subjected to additional froth flotation in one or more operations to provide what are termed "cleaner concentrates" and "cleaner tails." In some operations where the collector is itself a frother agent, it is possible to omit the addition of a frother per se, but in most operations a frother is essential, as is a collector.

Much progress has been made in developing improved and more selective collectors for the froth flotation of specific mineral values, including modifiers for existing collectors. Frothers have generally been considered on the basis of the froth generated. The available frothers are either too weak in frothing properties which produces poor recovery or too strong in such properties which produces poor selectivity. Combinations of these frothers generally lead to less recovery and selectivity than is desirable and recourse is had to improved collectors.

If there could be developed a means for improving performance of frothing agents, such a development could lead to improved recovery and selectivity over what is possible solely by collector modification. Such a development could not only lead to better conservation of our depleting mineral resources but also could reduce costs and energy requirements in providing a given level of mineral values. The provision for such a development would fulfill a long-felt need and constitute a notable advance in the art.

In accordance with the present invention, there is provided an improved frother composition comprising from about 1 to about 99 weight percent of a frothing agent and, correspondingly, from about 99 to about 1 weight percent of an amino-aldehyde resin containing free methylol groups, alkoxymethyl groups, or both.

The improved performance of the frothing composition of the present invention is highly surprising and totally unexpected. The particular amino-aldehyde resin is not an effective frothing agent and, therefore, it is totally unexpected that replacement of part of the dosage of a conventional frother agent with a like amount of the amino-aldehyde resin would lead to increased recovery and selectivity of mineral values using a standard collector in conjunction with froth flotation.

The present invention is specifically directed to a combination of two ingredients, a conventional frothing agent and a particular amino-aldehyde resin. The particular proportions of the ingredients making up the composition appear to vary widely depending upon the particular frothing agent and amino-aldehyde resin employed, and there appears to be an optimum mixing ratio for each combination. However, the combination of frothing agent and amino-aldehyde resin appears to provide advantages over the sole use of frothing agent at the level present in the combination in spite of the ineffectiveness of the particular amino-aldehyde resin as a frothing agent. Accordingly, the frother combination of the present invention may contain from about 1 to about 99 weight percent of frothing agent and, correspondingly, from about 1 to about 99 weight percent of the amino-aldehyde resin. In preferred combinations, the frothing agent will comprise about 50 to 80, more preferably 67 to 75, weight percent of the frother combination and the amino-aldehyde resin, correspondingly, will comprise about 50 to 20, more preferably 33 to 25 weight percent thereof.

Conventional frothing agents include alcohols of about 5 to 8 carbon atoms, pine oils, polypropylene glycols and ethers, ethoxylated alcohols of about 5 to 8 carbon atoms, and the like. Many of the conventional frothing agents are mixed compositions. The mixtures arise both for performance and economical reasons. For example, a particularly effective frothing agent is a mixture of 90 weight percent of methyl isobutyl carbinol and 10 weight percent of still bottoms.

The amino-aldehyde resin, as that term is employed herein, is a low molecular weight reaction product of an aldehyde and an amino-compound reactive therewith wherein the reaction product contains free methylol groups, alkylated derivatives of such reaction products, or both. Amino-compounds which form such reaction products with aldehydes that are useful in the composition of the present invention include, for example, urea, melamine, guanadines, ethylene urea, acetylene diureas, pyrimidines, tetrahydropyrimidones, thiourea, carbamates, urethanes, and the like. As aldehydes to form the reaction products, there may be used such aldehydes as formaldehyde, acetaldehyde, benzaldehyde, glyoxal, and the like. The particular molar ratio of aldehyde to amino-compound used to form the reaction product will vary depending upon the reaction functionality of the amino-compound. Melamine, for example, has a reaction functionality of six and can react with up to six moles of aldehyde.

The amino-aldehyde is preferably an alkylated aldehyde reaction product, alkylation generally increasing stability of the reaction product. Useful alkylating agents include methanol, ethanol, butanol and the like. It is generally preferred to alkylate fully the methylol compound provided. Thus, in the case of melamine, the hexamethoxymethyl derivative is preferred. Also, in the case of acetylenediurea, the tetraalkoxymethyl derivative is preferred.

A collector is one which selectively forms a hydrophobic coating on the mineral surfaces (sulfides, oxides or salts) so that the air bubbles will cling to the solid particles in the presence of frother and concentrate them in the froth. The most common collectors are hydrocarbon compounds which contain anionic or cationic polar group. Examples are the fatty acids, the fatty soaps, xanthates, thionocarbamates, dithiocarbamates, fatty sulfates, and fatty sulfonates and the fatty amine derivatives. Other useful collectors are mercaptans, thioureas, dialkyldithiophosphates, and dialkyldithiophosphinates.

In carrying out processing using the frother composition of the present invention, an ore capable of benefication by froth flotation is selected. The ore is ground to provide particles of flotation size and slurried in water for processing. An effective amount of the frothing composition of the present invention is added along with a suitable collector and other additives normally employed in processing the ore. The frother employed in the composition of the present invention may be that frother conventionally employed, except that, of course, the specified amino-aldehyde resin is used therewith.

After the ore has been properly conditioned with the various additives selected, it is subjected to froth flotation following conventional procedures. In most instances, the desired ore values will be floated off as a froth, leaving behind tailings of the gaugue materials. In some instances, the material floated off may be gaugue materials, with the desired mineral values remaining behind. In still other instances, the floated material may represent desired mineral values of one type and the material remaining behind may represent desired mineral values of another type. The mineral values being processed may be those obtained from a previous froth flotation procedure, processing being purification thereof to provide a cleaner concentrate.

The invention is more fully illustrated in the examples which follow wherein all parts and percentages are by weight unless otherwise specified.

EXAMPLES 1-4

A series of runs were made using a copper ore. The ore slurry was processed at pH 10.8-11.0 using a mixture of 2 parts of potassium amyl xanthate and 1 part of sodium di-secondary butyl thiophosphate as collector at a dosage of 0.1 pound per ton of ore. Various frother were evaluated, with identity and dosage levels given in Table I which also indicates the recovery obtained.

TABLE 1

Copper Recovery Using Various Frothers

| Example | Frother | Dosage lb./ton | Weight (%) Recovery | % Cu Feed | % Cu Tails | % Cu Conc. | Copper Recovery (%) |
|---|---|---|---|---|---|---|---|
| Comparative A | HMMM[1] | 0.025 | — | | Failed to Froth | | |
| Comparative B | HMMM | 0.062 | 3.66 | 0.280 | 0.094 | 5.16 | 67.58 |
| 1 | 1 part HMMM + 1 part M1BC[2] | 0.025 | 3.56 | 0.284 | 0.075 | 5.96 | 74.59 |
| 2 | 1 part HMMM + 2 parts M1BC | 0.025 | 4.87 | 0.281 | 0.050 | 4.79 | 83.06 |
| 3 | 1 part HMMM + 3 parts M1BC | 0.025 | 5.40 | 0.278 | 0.018 | 4.84 | 93.88 |
| 4 | 1 part HMMM + 4 parts M1BC | 0.025 | 3.89 | 0.284 | 0.050 | 6.06 | 83.08 |
| Comparative C | M1BC | 0.025 | 5.29 | 0.282 | 0.069 | 4.09 | 76.82 |
| Comparative D | M1BC | 0.0125 | 7.77 | 0.269 | 0.088 | 2.42 | 69.84 |

Notes:
[1]HMMM = Hexakis(methoxymethyl)melamine
[2]M1BC = 90% Methyl isobutyl carbinol and 10% still bottoms.

The results show that a combination of 3 parts of hexakis(methoxymethyl)melamine and 1 part of methylisobutyl carbinol composition provides optimum results in copper recovery. The preferred combinations are more effective than the individual components, thus providing a synergistic effect.

EXAMPLES 5-8

The procedure of Examples 1-4 was repeated except that a different frother was used. The frother employed was Pine Oil (P.O.). Details and results are given in Table II.

TABLE II

Copper Recovery Using Pine Oil Frothers

| Example | Frother | Dosage lb./ton | Weight (%) Recovery | % Cu Feed | % Cu Tail | % Cu Conc. | Copper Recovery (%) |
|---|---|---|---|---|---|---|---|
| Comparative E | Pine Oil | 0.0125 | 4.13 | 0.294 | 0.088 | 5.09 | 71.34 |
| Comparative F | Pine Oil | 0.025 | 4.09 | 0.285 | 0.069 | 5.35 | 76.77 |
| 5 | 1 part P.O. + 1 part HMMM | 0.025 | 3.12 | 0.290 | 0.075 | 6.97 | 74.95 |
| 6 | 2 parts P.O. + 1 part HMMM | 0.025 | 3.34 | 0.288 | 0.075 | 6.45 | 74.85 |
| 7 | 3 parts P.O. + 1 part HMMM | 0.025 | 4.04 | 0.257 | 0.056 | 5.04 | 79.11 |
| 8 | 4 parts P.O. + 1 part HMMM | 0.025 | 4.01 | 0.289 | 0.056 | 5.86 | 81.39 |

The results again show synergistic effects of combinations of the present invention.

EXAMPLES 9-12

The procedure of Examples 1-4 was again followed except that a different frother was used. The frother was a polypropylene glycol (PPG) of 425 molecular weight. Details and results are given in Table III.

Table 3

Copper Recovery Using Polypropylene Glycol Frothers

| Example | Frother | Dosage lb./ton | Weight (%) Recovery | % Cu Feed | % Cu Tail | % Cu Conc. | Copper Recovery (%) |
|---|---|---|---|---|---|---|---|
| Comparative G | PPG | 0.025 | 3.84 | 0.284 | 0.069 | 5.66 | 76.62 |
| 9 | 1 part PPG + 1 part HMMM | 0.025 | 3.31 | 0.281 | 0.075 | 6.31 | 74.23 |
| 10 | 2 parts PPG + 1 part HMMM | 0.025 | 3.29 | 0.281 | 0.050 | 7.07 | 82.78 |
| 11 | 3 parts PPG + 1 part HMMM | 0.025 | 3.65 | 0.277 | 0.050 | 6.26 | 82.59 |
| 12 | 4 parts PPG + 1 part HMMM | 0.025 | 4.36 | 0.292 | 0.075 | 5.05 | 75.42 |

The results again show synergism using combinations of the present invention.

EXAMPLES 13-16

A series of amino-aldehyde reaction products containing free methylol groups, alkoxymethyl groups, or both, were evaluated as frothing agents in the beneficiation of chalcopyrite using as collectors a mixture of 2 parts of potassium xanthate and 1 part of a dialkyldithiophosphate which was a mixture of equal parts of diisobutyldithiophosphate at a total collector dosage of 0.01. The results are given in Table IV which follows.

TABLE IV

| Example No. | Frother[6] | Weight Recovery (%) | Cu Assay (%) Feed | Cu Assay (%) Tail | Cu Assay (%) Conc. | Cu Recovery (%) | Mo Assay Feed | Mo Assay Tail | Mo Assay Conc. | Mo Recovery (%) |
|---|---|---|---|---|---|---|---|---|---|---|
| Comp. 4 | MIBC[1] | 5.49 | 0.672 | 0.202 | 8.76 | 71.58 | 0.0115 | 0.0054 | 0.1158 | 55.47 |
| 13 | MIBC + MEM[2] | 6.62 | 0.623 | 0.170 | 7.01 | 74.51 | 0.011 | 0.0041 | 0.1091 | 64.28 |
| 14 | MIBC + BM[3] | 4.87 | 0.614 | 0.175 | 9.18 | 72.86 | 0.012 | 0.0046 | 0.1575 | 63.67 |
| 15 | MIBC + BU[4] | 4.47 | 0.612 | 0.131 | 10.90 | 79.56 | 0.011 | 0.005 | 0.1493 | 58.28 |
| 16 | MIBC + MEB[5] | 4.19 | 0.632 | 0.192 | 10.24 | 70.95 | 0.012 | 0.0043 | 0.1688 | 64.26 |

NOTES:
[1]MIBC = Methyl isobutyl carbinol
[2]MEN = Trimethoxymethyl, triethoxymethyl melamine, ratio MIBC/MEN = 70/30
[3]BM = Pentabutoxymethylmethylol melamine, ratio MIBC/BM = 90/10
[4]BU = Dibutoxymethylurea, ratio MIBC/BU = 90/10
[5]MEB = Dimethoxymethyl, diethoxymethylbenzoguanamine, ratio MIBC/MEB = 90/10
[6]All frothers used at total dosage of 0.035 pound per ton of ore.

The amino-aldehyde reaction products when evaluated alone in the processing described were totally ineffective as frothers when used at 0.035 pound per ton.

The results show that a wide variety of amino-aldehyde reaction products containing free methylol groups, alkoxymethyl groups, or both in combination with a conventional frother provide increased recovery of copper values, molybdenum values, or both relative to the use of the separate frother ingredients alone.

EXAMPLES 17-32

A series of froth flotations of various minerals were made using appropriate collectors with specified frothing agents. The details and results are given in the various tables below.

TABLE V

CANADIAN COPPER ORE FLOTATION
Collector: Isopropylethylthionocarbamate 0.025 lb/ton
Fuel Oil 0.016 lb/ton.

| Example No. | Frother | Dosage (lb/ton) | Assay % Cu Feed | Assay % Cu Tail | Assay % Cu Conc. | Cu % Recovery | Assay Mo % Feed | Assay Mo % Tail | Assay Mo % Conc. | Mo % Recovery |
|---|---|---|---|---|---|---|---|---|---|---|
| Comp. 1 | Note 1. | 0.016 | 0.378 | 0.037 | 9.51 | 90.54 | 0.015 | 0.004 | 0.372 | 74.67 |
| 17 | Note 2. | 0.016 | 0.367 | 0.037 | 11.12 | 90.22 | 0.014 | 0.002 | 0.407 | 86.18 |

Notes:
1. Methyl isobutyl carbinol (MIBC)
2. 95 Parts MIBC + 5 parts hexamethoxymethylmelamine (HMMM)

These results show that at 5% melamine resin in the frother composition, improved grade of copper concentrate and increased recovery of molybdenum values are obtained.

TABLE VI

TENNESSEE ZINC SULFIDE ORE FLOTATION
Collectors: sodium diethyldithiophosphate 0.05 lb/ton
sodium diisopropyldithiophosphate 0.05 lb/ton pH: 8.7

| Example | Frother | Dosage lb./ton | Assay % Zn Feed | Assay % Zn Tail | Assay % Zn Conc. | % Zn Recovery |
|---|---|---|---|---|---|---|
| Comp. J | I | 0.07 | 4.13 | 0.64 | 40.17 | 85.87 |
| 18 | II | 0.07 | 4.32 | 0.64 | 42.07 | 86.51 |
| 19 | III | 0.07 | 4.24 | 6.62 | 43.64 | 86.61 |
| 20 | IV | 0.07 | 4.20 | 0.59 | 44.28 | 87.29 |
| 21 | V | 0.07 | 4.20 | 0.64 | 41.70 | 86.08 |

Frothers:
I Crude monomethylether of polypropylene glycol.
II 10 parts HMMM (see Table IV) and 90 parts I
III 20 parts HMMM and 80 parts I
IV 30 parts HMMM and 70 parts I
V 40 parts HMMM and 60 parts I
These results show improved recovery and grade over the prior art frother.

TABLE VII

| | | | Same Ore and Collectors as in Table II | | | |
|---|---|---|---|---|---|---|
| | | Dosage | Assay % Zn | | | % Zn |
| Example | Frother | Lb./ton | Feed | Tail | Conc. | Recovery |
| Comp. K | Note 1 | 0.07 | 4.15 | 0.72 | 39.69 | 84.19 |
| 22 | Note 2 | 0.07 | 4.23 | 0.67 | 42.18 | 85.55 |
| 23 | Note 3 | 0.07 | 4.11 | 0.64 | 44.13 | 85.66 |

Notes:
1 polypropylene glycol 425 (PPG)
2 70 parts PPG + 30 parts HMMM (See Table IV)
3 60 parts PPG + 40 parts HMMM
These results also show improved recovery and grade over the prior art frother.

TABLE VIII

UTAH COPPER ORE FLOTATION
Collectors: Reconstituted Cresylic Acid 0.034 lb./ton
No. 2 Fuel Oil 0.08 lb./ton pH: 9.8

| | | Dosage | Assay % Cu | | | % Cu | Assay % Mo | | | % Mo |
|---|---|---|---|---|---|---|---|---|---|---|
| Example | Frother | (lb./ton) | Feed | Tail | Conc. | Recovery | Feed | Tail | Conc. | Recovery |
| Comp. L | Note 1 | 0.2 | 0.510 | 0.044 | 7.07 | 91.94 | 0.020 | 0.004 | 0.246 | 81.41 |
| 24 | Note 2 | 0.2 | 0.495 | 0.044 | 8.04 | 91.61 | 0.018 | 0.002 | 0.293 | 89.73 |
| 25 | Note 3 | 0.2 | 0.480 | 0.037 | 8.48 | 92.68 | 0.018 | 0.002 | 0.280 | 88.71 |
| 26 | Note 4 | 0.2 | 0.542 | 0.044 | 8.32 | 92.38 | 0.019 | 0.002 | 0.280 | 89.96 |
| 27 | Note 5 | 0.2 | 0.568 | 0.037 | 8.26 | 93.91 | 0.021 | 0.002 | 0.293 | 91.01 |
| 28 | Note 6 | 0.2 | 0.531 | 0.044 | 6.30 | 92.37 | 0.017 | 0.002 | 0.0200 | 89.42 |

Notes:
1 Methyl Isobutyl Carbinol (MIBC)
2 90 parts MIBC + 10 parts HMMM (See Table IV)
3 80 parts MIBC + 20 parts HMMM
4 70 parts MIBC + 30 parts HMMM
5 60 parts MIBC + 40 parts HMMM
6 50 parts MIBC + 50 parts HMMM
These results show either improved grade or recovery or both over the prior art frother.

TABLE IX

CANADIAN COPPER ORE FLOTATION
Collectors: Potassium Amyl Xanthate 0.02 lb./ton
Fuel Oil 0.037 lb./ton pH 7.5-8.0

| | | Dosage | Assay % Cu | | | % Cu | Assay % Mo | | | % Mo |
|---|---|---|---|---|---|---|---|---|---|---|
| Example | Frother | (lb./ton) | Feed | Tail | Conc. | Recovery | Feed | Tail | Conc. | Recovery |
| Comp. M | MIBC | 0.074 | 0.248 | 0.081 | 4.31 | 68.64 | 0.062 | 0.007 | 1.37 | 89.13 |
| 29 | 50/50 MIBC/ HMMM | 0.074 | 0.245 | 0.031 | 5.44 | 85.47 | 0.065 | 0.007 | 1.51 | 89.65 |

Notes:
See Table IV
These results also show improved grade or recovery or both over the prior art frother.

TABLE X

ARIZONA COPPER ORE FLOTATION

Collectors:
Allylamylxanthane 0.0075 lb./ton
Shell Oil 0.04 lb./ton
Potassium amylxanthane 0.005 lb./ton
pH 10.8-11.0

| | | Dosage | Assay % Cu | | | % Cu | Assay % Mo | | | % Mo |
|---|---|---|---|---|---|---|---|---|---|---|
| Example | Frother | (lb./ton) | Feed | Tail | Conc. | Recovery | Feed | Tail | Conc. | Recovery |
| Comp. N | MIBC | 0.06 | 0.33 | 0.018 | 6.37 | 94.85 | 0.036 | 0.007 | 0.593 | 81.53 |
| 30 | 90 MIBC/10 HMMM | 0.06 | 0.32 | 0.006 | 6.27 | 98.21 | 0.033 | 0.004 | 0.579 | 88.40 |
| 31 | 80 MIBC/20 HMMM | 0.06 | 0.35 | 0.018 | 4.91 | 95.15 | 0.029 | 0.004 | 0.400 | 93.49 |
| 32 | 70 MIBC/30 HMMM | 0.06 | 0.31 | 0.006 | 6.88 | 98.15 | 0.031 | 0.002 | 0.653 | 93.79 |

Notes:
See Table IV
These results again show improved grade or recovery or both over the prior art frother.

We claim:

1. A composition comprising from about 1 to about 99 weight percent of a frothing agent selected from the group consisting of pine oil, creosote and cresylic acid and, correspondingly, from about 99 to about 1 weight percent of an amino-aldehyde resin comprising the alkylated reaction product of an aldehyde and a material selected from the group consisting of urea, melamine, guanamines, ethylene urea, acetylene diureas, pyrimidines, tetrahydropyrimidines, thiourea carbamates and urethanes.

2. The composition of claim 1 wherein from about 20 to 50 weight percent of the amino-aldehyde resin is present.

3. The composition of claim 1 wherein said frothing agent is pine oil.

4. The composition of claim 2 wherein said frothing agent is pine oil.

5. The composition of claim 4 wherein said amino-aldehyde resin is hexakis(methoxymethyl)melamine.

* * * * *